Dec. 4, 1923.						1,476,602
F. M. DUNCAN
AUTOMOBILE FENDER BRACE
Original Filed Aug. 22, 1922
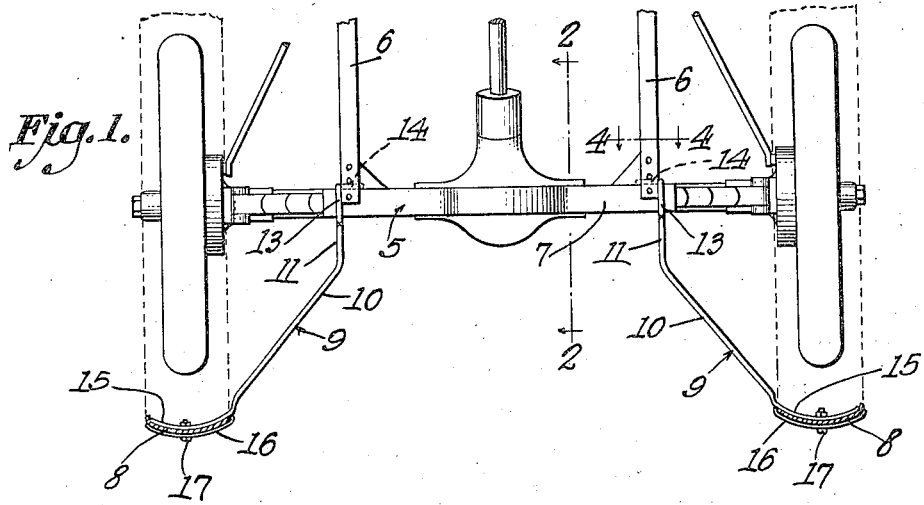
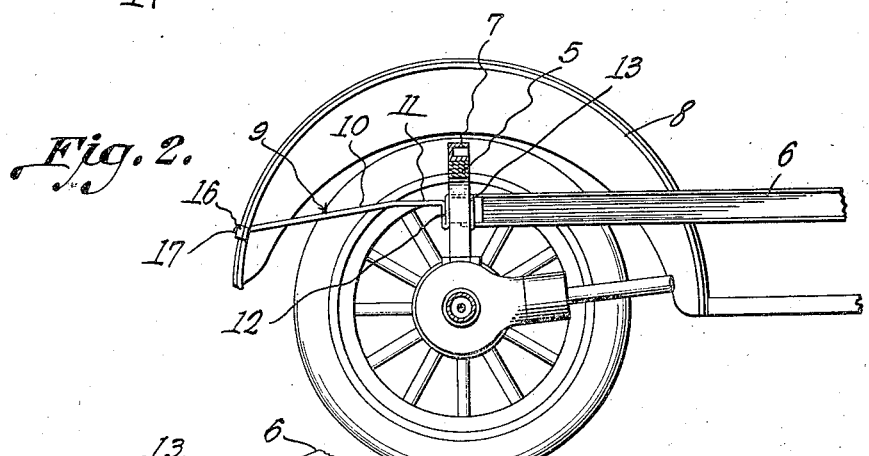
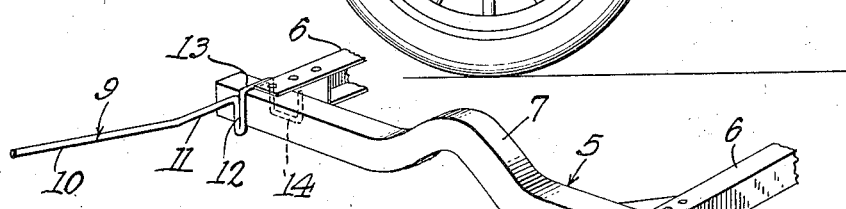
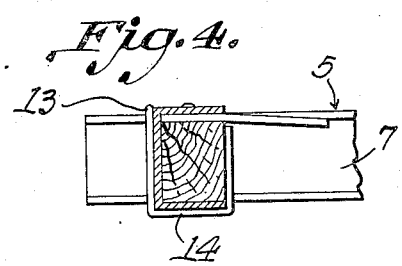
Inventor
Forest M. Duncan
Jerry A. Mathews
By
Attorney Patented Dec. 4, 1923.

1,476,602

UNITED STATES PATENT OFFICE.

FOREST M. DUNCAN, OF COTTER, IOWA, ASSIGNOR OF TWENTY-FIVE AND ONE-HALF PER CENT TO FRED M. MOLSBERRY, OF COLUMBUS JUNCTION, IOWA, AND TWENTY-FIVE AND ONE-HALF PER CENT TO FRANK L. VANHORN, OF COTTER, IOWA.

AUTOMOBILE FENDER BRACE.

Application filed August 22, 1922, Serial No. 583,591. Renewed October 25, 1923.

*To all whom it may concern:*

Be it known that FOREST M. DUNCAN, a citizen of the United States, residing at Cotter, in the county of Louisa and State of Iowa, has invented certain new and useful Improvements in Automobile Fender Braces, of which the following is a specification.

My invention relates to a fender brace particularly adapted for use in connection with the rear fender of Ford automobiles, while not necessarily restricted to this use.

Important objects of the invention are to provide a device of the above mentioned character, which may be secured to the chassis and fender, by the employment of a single bolt, which is light and strong and sufficiently resilient to impart to the device durability, which will securely hold the fender against rattling and retain it in the proper position in the proper shape, and which may be applied to the ordinary Ford automobile quickly and conveniently.

Other objects and advantages of the invention will be apparent during the course of the following description.

In the accompanying drawings forming a part of this specification and in which like numerals are employed to designate like parts throughout the same, Fig. 1 is a plan view of the rear end of a Ford automobile, parts in horizontal section, showing my fender brace applied thereto, Fig. 2 is a longitudinal section taken on line 2—2 of Fig. 1, Fig. 3 is a perspective view of the brace, applied to the rear end of the chassis, and, Fig. 4 is a detail transverse section taken on line 4—4 of Fig. 1.

In the drawings, wherein for the purpose of illustration is shown a preferred embodiment of my invention, the numeral 5 designates the chassis of a Ford automobile, as a whole, embodying longitudinal beams 6, connected at their rear ends by a transverse beam 7. The numeral 8 designates the usual fenders of a Ford automobile.

The numeral 9 designates my fender braces, each of which is formed of a rod which is suitably stiff and resilient. This rod includes a body portion 10, which is arranged at an angle, and at the inner end of the body portion 10 is a shank 11, which is bent upon itself at its inner end, forming a transverse portion 12, which constitutes the inner side of an inverted U-shaped socket 13, adapted to receive the transverse beam 5, as shown. Formed upon the inner end of the socket 13 is a U-shaped socket 14, arranged at a right angle thereto, and adapted to receive the longitudinal beam 6. In the application of the device to the chassis, it is obvious that the socket 14 is first placed beneath the longitudinal beam 6 and moved upwardly so that said socket receives the beam 6. During this operation, the inverted U-shaped socket 13 is above the transverse beam 5, and may now be forced downwardly, and will spring upon the transverse beam 5, the material of the socket being sufficiently resilient for this purpose. After the socket has been forced downwardly past dead center it will tend to lock upon the transverse beam.

At the outer end of the body portion 10, is a longitudinally curved transverse fender supporting bar 15, preferably integral therewith. This fender supporting bar is adapted to engage beneath the fender 8, and corresponds to the curvature thereof, while a longitudinally curved cap 16, is adapted to be arranged upon the outer surface of the fender and corresponds to the curvature thereof. The support 15 and cap 16 are connected by a single bolt 17, and hence these elements are drawn together and securely clamped to the opposite sides of the fender. When the device is thus secured to the fender, such connection serves to lock the sockets to the longitudinal and transverse bars of the chassis, against displacement.

It is obvious that the two devices are substantially identical, except that the sockets 13 extend inwardly in opposite directions. For the purpose of convenience, in the claims, the sockets 14 will be referred to as longitudinal sockets, while the sockets 13 will be defined as transverse sockets.

In view of the foregoing description it is thought that the construction and use of the device is made clear, and no further explanation is necessary.

It is to be understood that the form of my invention herewith shown and described is to be taken as a preferred example of the same, and that various changes in the size, shape, and arrangement of parts may be resorted to without departing from the spirit of the invention or the scope of the subjoined claims.

Having thus described my invention, I claim:

1. A device for supporting the rear fender of an automobile, comprising a rod bent near one end to form an inverted U-shaped socket extending longitudinally of the rod, one side of the U-shaped socket being formed of portions of the rod bent into close relation and extending substantially parallel to each other, said inverted U-shaped socket being arranged upon the top of the transverse member of the chassis and bodily receiving the same, said rod having its free end extended from the forward end of the socket for producing with such forward end a U-shaped transverse socket disposed at substantially a right angle to the longitudinal socket and facing upwardly and mounted upon the bottom of the longitudinal member of the chassis and bodily receiving the same, and means for connecting the rear end of the rod with the rear fender of the automobile.

2. A device for supporting the rear fender of an automobile, comprising a rod bent near one end to form an inverted U-shaped socket extending longitudinally of the rod, said inverted U-shaped socket being arranged upon the top of the transverse member of the chassis and bodily receiving the same, said rod having its free end extended from the forward end of the socket for producing with such forward end a U-shaped transverse socket disposed at substantially a right angle to the longitudinal socket and facing upwardly and mounted upon the bottom of the longitudinal member of the chassis and bodily receiving the same, and means for connecting the rear end of the rod with the rear fender of the automobile.

In testimony whereof I affix my signature.

FOREST M. DUNCAN.